(12) United States Patent
Bartos et al.

(10) Patent No.: US 11,819,463 B2
(45) Date of Patent: Nov. 21, 2023

(54) BASE FLOOR PART, REPLACEMENT FLOOR, MODULAR SYSTEM AND METHOD FOR ENLARGING A REAR CARGO SPACE OF A MOTOR VEHICLE

(71) Applicant: API CZ s.r.o., Slapy u Tábora (CZ)

(72) Inventors: Miroslav Bartos, Tabor (CZ); Marek Huisl, Bechyne (CZ)

(73) Assignee: API CZ S.R.O., Slapy u Tabora (CZ)

( * ) Notice: Subject to any disclaimer, the term of this patent is extended or adjusted under 35 U.S.C. 154(b) by 139 days.

(21) Appl. No.: 17/399,612

(22) Filed: Aug. 11, 2021

(65) Prior Publication Data

US 2022/0047437 A1 Feb. 17, 2022

(30) Foreign Application Priority Data

Aug. 11, 2020 (EP) ..................................... 20190458

(51) Int. Cl.
*A61G 3/08* (2006.01)
*B62D 25/20* (2006.01)

(52) U.S. Cl.
CPC ....... *A61G 3/0808* (2013.01); *B62D 25/2027* (2013.01)

(58) Field of Classification Search
CPC ................ B62D 25/2027; B62D 25/20; B62D 25/2054; B62D 29/04; B62D 65/00; B62D 63/025; B62D 21/12

USPC ............ 296/193.07, 187.08, 193.04, 193.05
See application file for complete search history.

(56) References Cited

U.S. PATENT DOCUMENTS

| 5,137,413 A | * | 8/1992 | Ressler ...................... B60P 1/43 |
| | | | 280/43.11 |
| 9,969,437 B1 | * | 5/2018 | Niederhofer ........... B62D 25/20 |
| 2013/0278018 A1 | * | 10/2013 | Preisler .................. B62D 25/20 |
| | | | 296/193.07 |
| 2015/0084377 A1 | * | 3/2015 | Thota ...................... B60N 2/36 |
| | | | 296/193.07 |
| 2016/0200372 A1 | * | 7/2016 | Ishii ....................... B62D 29/04 |
| | | | 296/193.07 |

FOREIGN PATENT DOCUMENTS

WO 2014/168493 A2 10/2014

* cited by examiner

*Primary Examiner* — Joseph D. Pape
*Assistant Examiner* — Veronica M Shull
(74) *Attorney, Agent, or Firm* — Banner & Witcoff Ltd.

(57) ABSTRACT

A base floor part made of plastic or composite material for a replacement floor for enlarging a rear cargo space of a motor vehicle, such as a compact car or an off-road vehicle, on which a wheelchair can be stored, is described. The base floor part may be connected to the vehicle body. The base floor part may include a preformed marking at which a front end portion can be separated to enable coupling with an extension floor part.

15 Claims, 6 Drawing Sheets

BASE FLOOR PART, REPLACEMENT FLOOR, MODULAR SYSTEM AND METHOD FOR ENLARGING A REAR CARGO SPACE OF A MOTOR VEHICLE

CROSS REFERENCE TO RELATED APPLICATIONS

This patent application claims priority to European Patent Application No. 20190458.8, filed Aug. 11, 2020, which is incorporated herein by reference in its entirety.

BACKGROUND

Field

The present disclosure relates to a base floor part made of plastic for a replacement floor for enlarging a rear cargo space of a motor vehicle. Further, the present disclosure provides a replacement floor, a modular system for a replacement floor and a method for enlarging a rear cargo space of a motor vehicle. The present disclosure in general concerns converting a motor vehicle into a wheelchair accessible motor vehicle.

Related Art

In order to make motor vehicles, especially compact cars or off-road vehicles, suitable for wheelchair users, the original equipment manufacturer (OEM)-side-mounted vehicle floor has so far been removed to the extent that essentially only the vehicle body, including the vehicle body floor and vehicle body side parts, remains. A separately produced vehicle floor, especially made of steel, individually adapted to the available rear cargo space and, if necessary, to the passenger area part in front of the cargo space, is then mounted on the vehicle body. In comparison to the OEM-sided vehicle floor, the replacement floor is designed in such a way that considerably more space is available, especially in the vertical direction, so that even a wheelchair user can sit upright on the wheelchair in the vehicle interior and is safely accommodated. Usually, vehicle ramps are attached to the exchange floor in such a way that they can still be swiveled so that the wheelchair user can easily enter and leave the vehicle.

From WO 2014/168493, such a replacement floor for converting a standard motor vehicle into a wheelchair accessible motor vehicle is known. The replacement floor according to WO 2014/168493 is a multi-part floor consisting of three floor sections, namely a rear section, a middle section and a front section, each of which is glued together with an adhesive.

However, there is no known technology that can provide a simple and flexible solution for providing replacement floors for different or changing available space conditions or vehicle types. A new, individual replacement floor must always be designed and manufactured for each vehicle type or when the available rear vehicle space is changed, even if it can be constructed in several parts according to WO 2014/168493.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
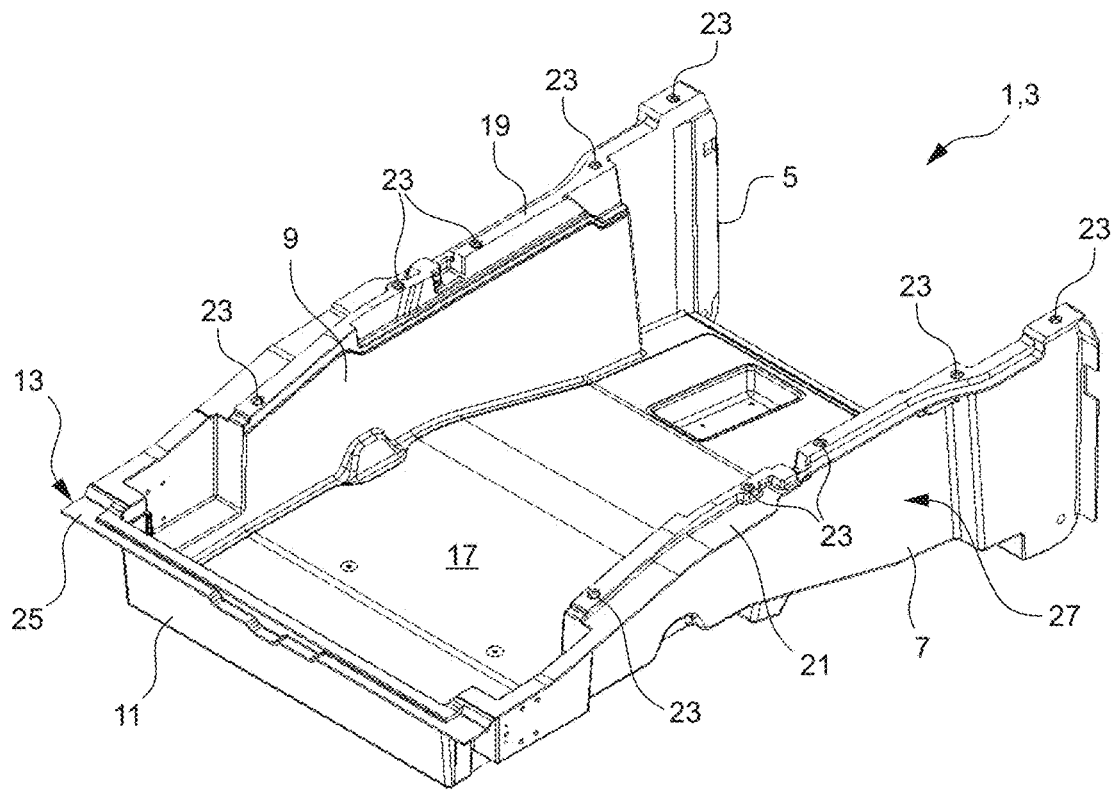
FIG. 1 shows a perspective view of a base floor part, according to an exemplary embodiment, of a replacement floor.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to overcome the disadvantages of the state of the art, in particular to further develop a replacement floor for motor vehicles in such a way that it can be flexibly and easily adapted to different types of motor vehicles and/or different available space conditions, whereby in particular the replacement floor can be produced at low cost.

According to an exemplary embodiment of the present disclosure, a base floor part for a replacement floor for enlarging a rear cargo space of a motor vehicle, such as a compact car or an off-road vehicle, is provided. The base floor part is made of plastic or composite material, in particular fiberglass. Such a replacement floor shall replace the OEM-sided manufactured vehicle floor in order to convert the conventional motor vehicle into a wheelchair accessible motor vehicle. The replacement floor is designed and configured such that a wheelchair can be stored on it in the rear cargo space of the motor vehicle. The base floor part is adapted to be connected to the vehicle body, preferably by means of screwing and/or gluing. The base floor part may comprise predefined attachment sections which are configured in design such that they may be attached to corresponding attachment sections of the vehicle body where the OEM-sided original vehicle floor has been attached to.

In an exemplary embodiment, the base floor part comprises a preformed marking at which a front end portion, particularly oriented in the direction of the driver's cab of the motor vehicle, can be separated to enable coupling with an extension floor part. The extension floor part may be made of plastic or composite material and may serve to enlarge, in particular lengthen, the base floor part in order to form a replacement floor. The base floor part is designed such that it can be used without any further extension floor part to form a replacement floor. The preformed marking defines a predetermined separation location at which the front end portion may for example be cut off. Therefore, false assembly may be prevented. Further, due to the preformed location of the marking, adjacent sections of the base floor part may be premanufactured such that a reliable and easy coupling with the extension floor part is enabled. The marking may be of visual and/or haptic nature.

According to an exemplary embodiment of the present disclosure, the marking of the base floor part is provided on a bottom side of the base floor part opposite the cargo space. With other words, the marking is oriented in the direction of the underground and/or such that it is not visible from the top side respectively the cargo space.

In a further exemplary embodiment of the base floor part according to the present disclosure, the marking extends crosswise, in particular perpendicular, with regard to the longitudinal extension of the base floor part. Alternatively or additionally, the marking extends across essentially the entire width of the base floor part. The width dimension is considered to be a dimension crosswise with regard to the longitudinal extension of the base floor part. Due to the so-designed marking, separating, in particular cutting off, the predefined front end portion of the base floor part may easily be performed.

According to an exemplary embodiment of the base floor part, the marking is configured as a material weakening, in particular, a notch or a recess. The material weakening may be configured such that the material thickness in the area of the material weakening is thinner than the material thickness of adjacent sections of the base floor part. The material weakening, in particular the notch or the recess, may be continuously provided on the bottom side of the base floor part or alternatively may comprise a sequence of subsequent material weakening areas, such as a number of perforations or the like. The material weakening may further comprise an essentially rectangular cross-section, V-shaped cross-section or rounded cross-section and/or may comprise a depth in the range of 0.5 mm to 2 mm and/or a width in the range of 2 mm to 4 mm.

In another exemplary embodiment of the present disclosure, the base floor part is manufactured by injection or resin transfer molding and/or is made of fiberglass. Further possible manufacturing methods are fiberglass molding or rotational molding. It is also possible to manufacture the base floor part from sheet metal on a press. For example, a mold may be use for the fiberglass material and vacuum to fill the mold. Preferably, the base floor part and the material weakening are manufactured in one piece respectively in one manufacturing step. Due to the design of the present base floor part, manufacturing costs may be decreased while flexibility regarding the modification of the replacement floors, in particular the adaption to different motor vehicle types and/or different available space conditions, is improved. Further, less production molds are necessary, thereby further decreasing manufacturing costs, in order to manufacture different types of replacement floors. The predefined and preformed marking makes it possible to base a great number of replacement floors on the same base floor part and to couple it with a great number of different extension floor parts each being adapted to a different vehicle type and/or different available cargo space.

According to a further exemplary embodiment, the base floor part comprises a length in its longitudinal extension of at least 1000 mm and at most 1700 mm. The inventors of the present disclosure have found that the specific longitudinal extension of the base floor part is especially suitable for covering a high number of different vehicle types and/or different vehicle cargo conditions. For example, the base floor part may be used as a replacement floor without any additional extension floor part. Further, additional extension floor parts may be coupled to the base floor part after having separated the front end portion of the base floor part, in order to be able to have a flexible adaption to different vehicle types and/or cargo spaces.

According to an exemplary embodiment of the present disclosure, a replacement floor or enlarging a cargo space of a motor vehicle, such as a compact car or an off-road vehicle, is provided. The replacement floor is configured such that a wheelchair may be stored on it in the rear cargo space. In general, the concept of the replacement floor is to convert a standard OEM-manufactured motor vehicle into a wheelchair accessible motor vehicle. The replacement floor according to the disclosure shall replace to OEM-sided manufactured standard vehicle floor in order to increase or enlarge the rear cargo space for wheelchair access.

In an exemplary embodiment, the replacement floor comprises a rear base floor part made of plastic or composite material. The base floor part may be configured in accordance with any of the previously described embodiments of the present application. The rear base floor part may comprises a length in the longitudinal direction of the motor vehicle of at least 1000 mm and at most 1500 mm. The replacement floor may further comprises an extension floor part made of plastic or composite material, in particular fiberglass, connected to the base floor part. The extension floor part may be glued and/or screwed to the base floor part. The length of the rear base floor part covers a broad range of vehicle types and different available cargo spaces such that is possible to form a replacement floor with only one additional extension floor part. The extension floor part may be connected to the base floor part in the area of a separation line where the preformed marking has been located in the base floor part.

In an exemplary embodiment, the base floor part and/or the extension floor part are reinforced by a reinforcement inlay, particularly made of metal, such as aluminum. The reinforcement inlay may be a flat and/or thin metal plate which may extend across essentially the entire width of the base floor part and/or the extension floor part. The reinforcement inlay of the base floor part and the reinforcement inlay of the extension floor part may be arranged in such a way on the base floor part respectively the extension floor part that the reinforcement inlays at least partially overlap in the vertical direction in an assembly state. The reinforcement inlays may on the one hand serve to reinforce the base floor part respectively the extension floor part and on the other hand may assure a reliable screwing of the base floor part and the extension floor part. According to a further development, the base floor part respectively the extension floor part including the corresponding reinforcement inlay is manufactured in one piece, preferably by injection or resin transfer molding. Further possible manufacturing methods are fiberglass molding or rotational molding. It is also possible to manufacture the base floor part from sheet metal on a press. For example, a mold may be use for the fiberglass material and vacuum to fill the mold. Therefore, it is possible that the reinforcement inlay is covered by the material of the base floor part respectively the extension floor part. The described manufacturing process enables cost efficient and precise manufacturing of the replacement floor.

In another exemplary embodiment, the base floor part and the extension floor part each comprise a predefined connection section for connecting with each other. In other words, the connection section of the base floor part and the connection section of the extension floor part are configured and oriented such that in an assembly state the connecting sections face each other and/or contact each other. At least the connection section of the base floor part and/or at least the connection section of the extension floor part are reinforced by a reinforcement inlay, particularly made of metal, preferably aluminum. Reinforcing the connection sections assures durability and safety of the connection between the base floor part and the extension floor part. Alternatively or additionally, the connection section of the base floor part and/or the connection section of the extension floor part are/is provided with at least one gluing recess for receiving glue. The glue serves to connect the extension floor part with the base floor part. The at least one gluing recess may extend across the longitudinal direction of the base floor part respectively the extension floor part. The at least one gluing recess may extend substantially across the entire width of the corresponding part. The extension may be straight. Further, the gluing recess must not be continuous but may be also comprise a sequence of subsequent gluing recess sections being spaced from one another. The predefined gluing recess simplifies connection between the base floor part and the extension floor part. With this configuration, the glue may be precisely introduced into the gluing recess such that the required and used volume of the glue may be limited to safe costs and may even be introduced when the base floor part and the extension floor part are already laid on top of each other in a preassembly state.

According to a further aspect of the present disclosure, a modular system for a replacement floor for enlarging a rear cargo space of a motor vehicle, such as a compact car or an off-road vehicle, is provided. The replacement floor may be configured in accordance with one of the previous aspects or example embodiments. In general, the replacement floor shall replace the OEM-sided manufactured original vehicle floor in order to enlarge the rear cargo space to convert the standard vehicle into a wheelchair accessible motor vehicle. The general idea of the modular system is to provide a conversion kit that enables flexibility and adaptability to different available cargo spaces respectively different vehicle types.

In an exemplary embodiment, the modular system comprises a predetermined number of rear base floor parts each having a predetermined dimension and a predetermined number of front extension floor parts each having a predetermined dimension. The rear base floor part may be configured and/or designed in accordance with one of the previous aspects and/or example embodiments of the present application. The base floor parts as well as the extension floor parts may be manufactured by injection or resin transfer molding and/or made of plastic or composite material, preferably of fiberglass. According to the modular system, each base floor part can be connected with each extension floor part to form a single, individual replacement floor. The number of at least one of the base floor parts or the extension floor parts is at least two whereas the other number of the base floor parts respectively the extension floor parts may be one. Preferably at least two base floor parts and at least three extension floor parts are provided.

Further, according to an exemplary embodiment, at least one base floor part and/or at least one extension floor part has a dimension which differs from the dimension of at least one other base floor part and/or at least one other extension floor part, respectively. In other words, the modular system according to the present disclosure comprises a predetermined set of two different floor part sections which in combination form an individual replacement floor for a specific vehicle type respectively a specific cargo space condition. The modular system may therefore also be referred to as a modular conversion kit. The modular system enables a manufacturer to combine each of a base floor part with each of an extension floor part to identify the best fit for a given vehicle type and/or available cargo space. Therefore, it is not necessary to develop and manufacture each replacement floor from the scratch, rather to build a number of different replacement floors by connecting a specific base floor part with a specific extension floor part. Additionally, if the base floor parts and the extension floor parts are manufactured by injection or resin transfer molding, the manufacturer does not need to develop and manufacture for each new replacement floor a further, new injection mold. Further possible manufacturing methods are fiberglass molding or rotational molding. It is also possible to manufacture the base floor part from sheet metal on a press. For example, a mold may be use for the fiberglass material and vacuum to fill the mold. The modular system gives the manufacturer the opportunity to limit the number of necessary injection molds to the combined number of base floor parts and extension floor parts.

In an exemplary embodiment, the length of the front extension floor parts is different than the length of the rear base floor parts. In an embodiment, the base floor parts are longer than the extension floor parts. Alternatively or additionally, the predetermined dimension is the length of the respective floor part in the longitudinal direction of the motor vehicle, respectively in the direction of the longitudinal extension of the base floor part respectively the extension floor part.

According to another example embodiment of the present disclosure, the base floor parts and the extension floor parts are configured to realize a replacement floor in accordance with one of the previous aspects and/or example embodiments of the present disclosure.

According to a further aspect of the present disclosure, a method for enlarging a rear cargo space of a motor vehicle, such as a compact car or an off-road vehicle, in order to store a wheelchair is provided. The method may also be referred to as a method for converting a standard OEM-vehicle into a wheelchair accessible vehicle such that a wheelchair may access the rear cargo space and may be stored in it.

According to the method, a predetermined number of rear base floor parts, in particular configured according to one of the previous aspects and/or example embodiments, each having a predetermined dimension and a predetermined number of front extension floor parts each having a predetermined dimension are provided. At least one base floor part and/or at least one extension floor part has a dimension which differs from the dimension of at least one other base floor part and/or at least one other extension floor part.

Further according to the disclosure, one base floor part and one extension floor part are connected to form a single, individual replacement floor. Therefore, the advantages associated with the modular system according to the present disclosure analogously apply to the method according to the present disclosure.

In a further exemplary embodiment of the method according to the disclosure, a base floor part flooring is disposed onto the base floor part and an extension floor part flooring is disposed onto the extension floor part such that the base floor part flooring and the extension floor part flooring overlap each other crosswise with regard to the longitudinal extension of the base floor part and the extension floor part, in particular in the vertical direction. Further, the base floor part flooring and the extension floor part flooring may be cut in a single cutting step, preferably such that a continuous transition between the floorings is realized. The floorings may be oriented to each other head to head.

According to a further development of the method according to the disclosure, the method is configured to realize a modular system for a replacement floor in accordance with any of the previously described aspects and/or embodiments of the modular system.

In the figures, a base floor part for a replacement floor for enlarging a rear cargo space of a motor vehicle is generally indicated with the reference sign 1, wherein the replacement floor itself is generally indicated with the reference sign 3. A base floor part 1 suitable to function as a replacement floor 3 without any extension floor part coupled thereto is consequently indicated with both reference signs 1 and 3.

The base floor part 1, respectively the replacement floor 3, according to FIG. 1 may be manufactured in one piece and is for example made of a composite material, preferably fiberglass.

The base floor part 1 generally comprises a tray shape wherein one longitudinal end is open. The opening 5 is oriented in the backwards direction of the motor vehicle and enables access of a wheelchair from the back into the vehicle cargo space. Further, the base floor part 1 comprises upright side walls 7, 9, essentially extending across the entire longitudinal extension of the base floor part 1. Opposite the opening 5 the base floor part 1 comprises an end-wall 11 being part of a front end portion 13. In particular if the base floor part 1 is used as a replacement floor 3 the front end portion 13 is oriented in the forward direction of the vehicle and is used for attaching the base floor part 1 to the vehicle body (not shown). On the other hand, the front end portion 13 may be separated from the rest of the base floor part 1 depending on the inner space conditions of the motor vehicle and/or if the base floor part 1 is to be connected with an additional extension floor part 15 (for example FIG. 4). The base floor part 1 also comprises a bottom wall 17 which, in the mounted state in the vehicle, may afterwards be covered with additional flooring. In general, the bottom wall 17 forms the new ground of the replacement floor and the vehicle onto which, for example, a wheelchair may be stored in the cargo space of the vehicle. The upright side walls 7, 9 lead into attachment flanges 19, 21 which are provided with screwing openings 23 for attaching the base floor part 1 to the vehicle body. Also, the front end portion 13 comprises an attachment flange 25 which leads into the end wall 11.

Figure 2:
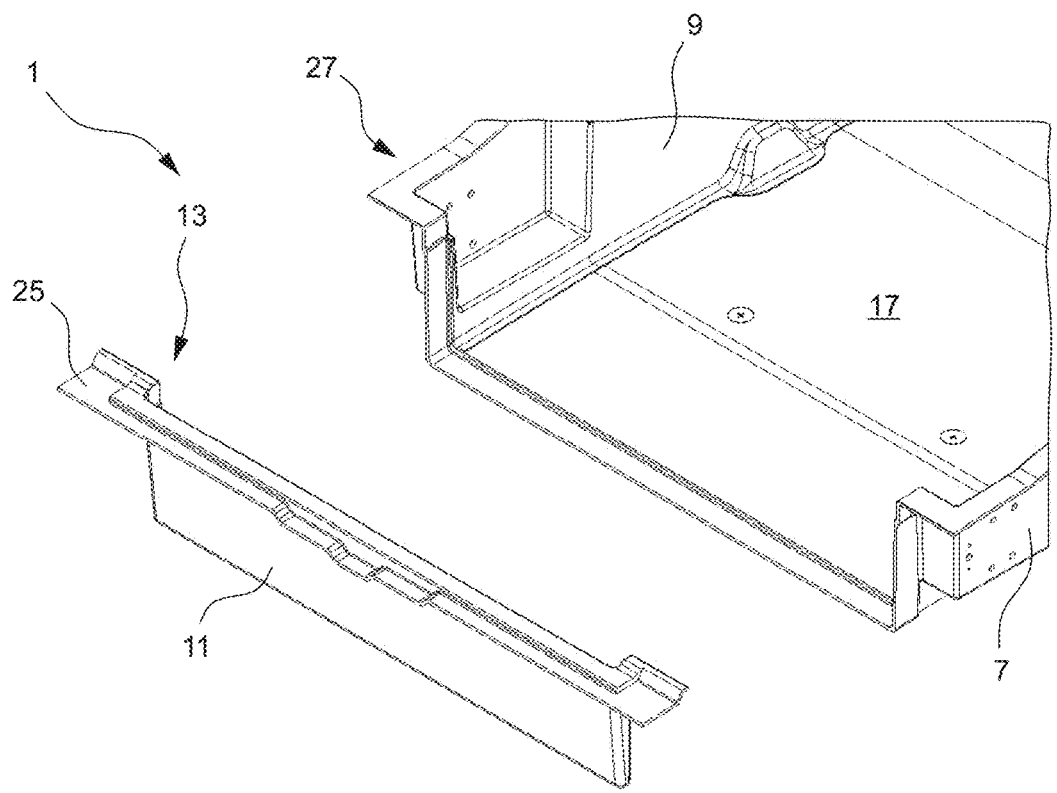
FIG. 2 shows a partial exploded view of the base floor part of FIG. 1 with a front end portion separated therefrom.
Figure 3:
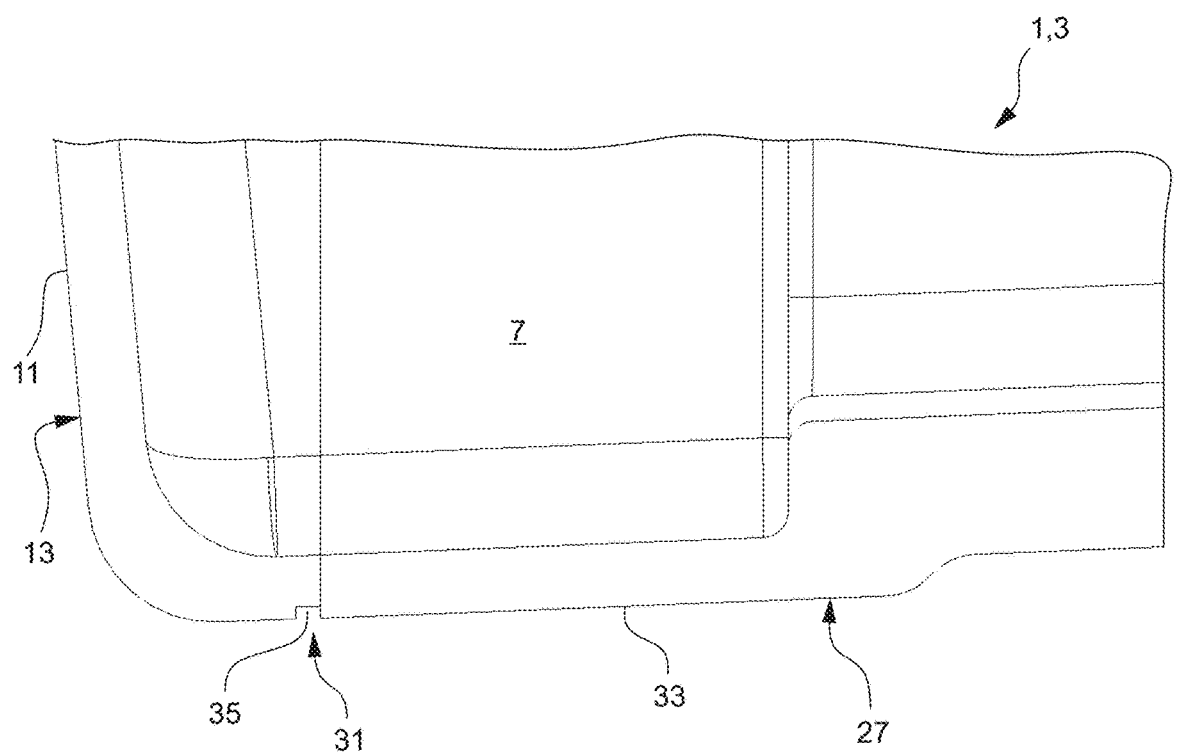
FIG. 3 shows a partial side view of the base floor part according to FIG. 1.

Taking into account FIGS. 2 and 3 a first aspect of the present disclosure is illustrated. If necessary, the front end portion 13 may be separated, in particular cut off, from the rest of the base floor part 1 which, in the following, is indicated as the rear end portion 27 of the base floor part 1. The part view of FIG. 2 illustrates the front end portion 13 separated from the rear end portion 27. To provide reliable separating of the front and back end portions 13, 27 and to avoid false assembly, the base floor part 1 according to the disclosure is provided with a preformed marking, generally indicated with the reference number 31, arranged on a bottom side 33 of the base floor part 1 oriented in the direction of the underground. As exemplarily illustrated in FIG. 3, the marking is configured as a material weakening in the form of a crosswise notch 35 introduced into the bottom side 33 of the base floor part 1. The notch 35 comprises an essentially rectangular cross section and extends essentially across the entire width of the base floor part 1. The marking, respectively the notch 35 may further be provided on the lateral upright side walls 7, 9, in particular on its outer surfaces oriented in the direction of the environment of the vehicle.

Figure 4:
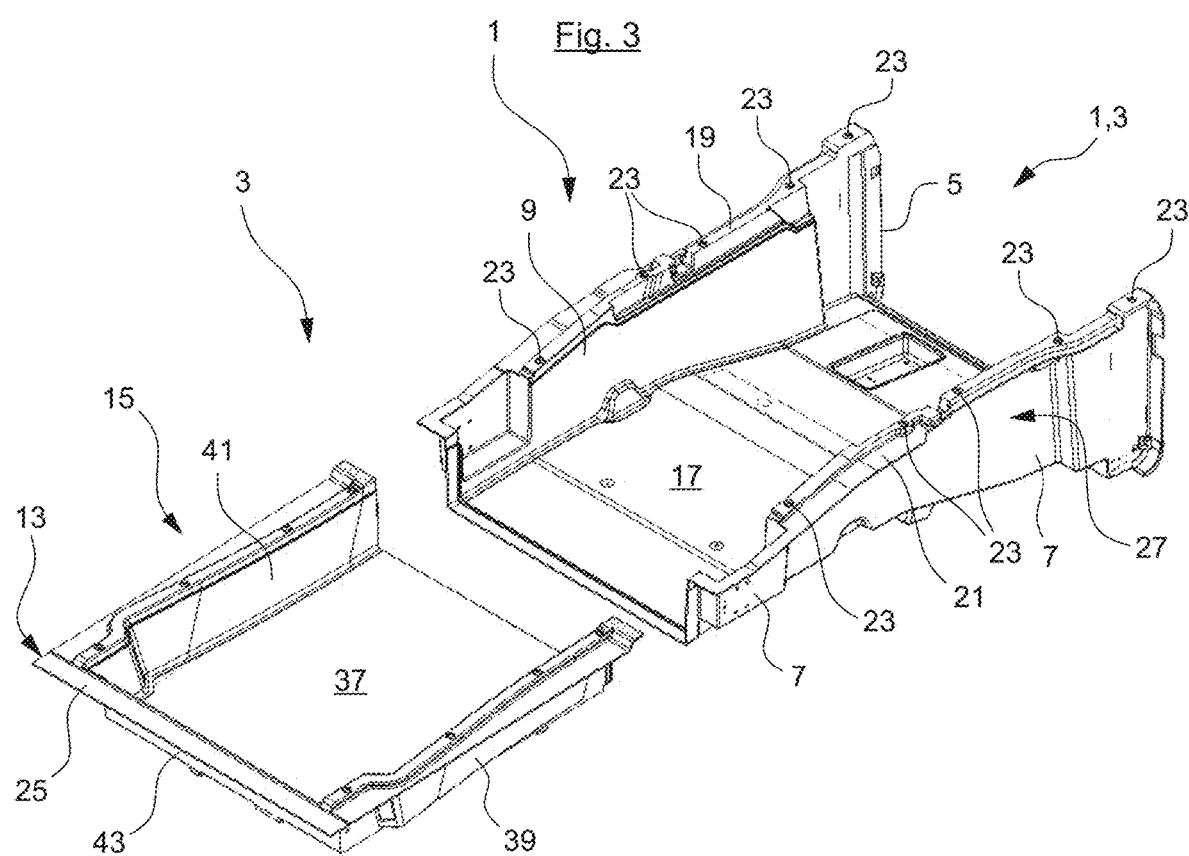
FIG. 4 shows a replacement floor according to an exemplary embodiment in a preassembly state.
Figure 5:
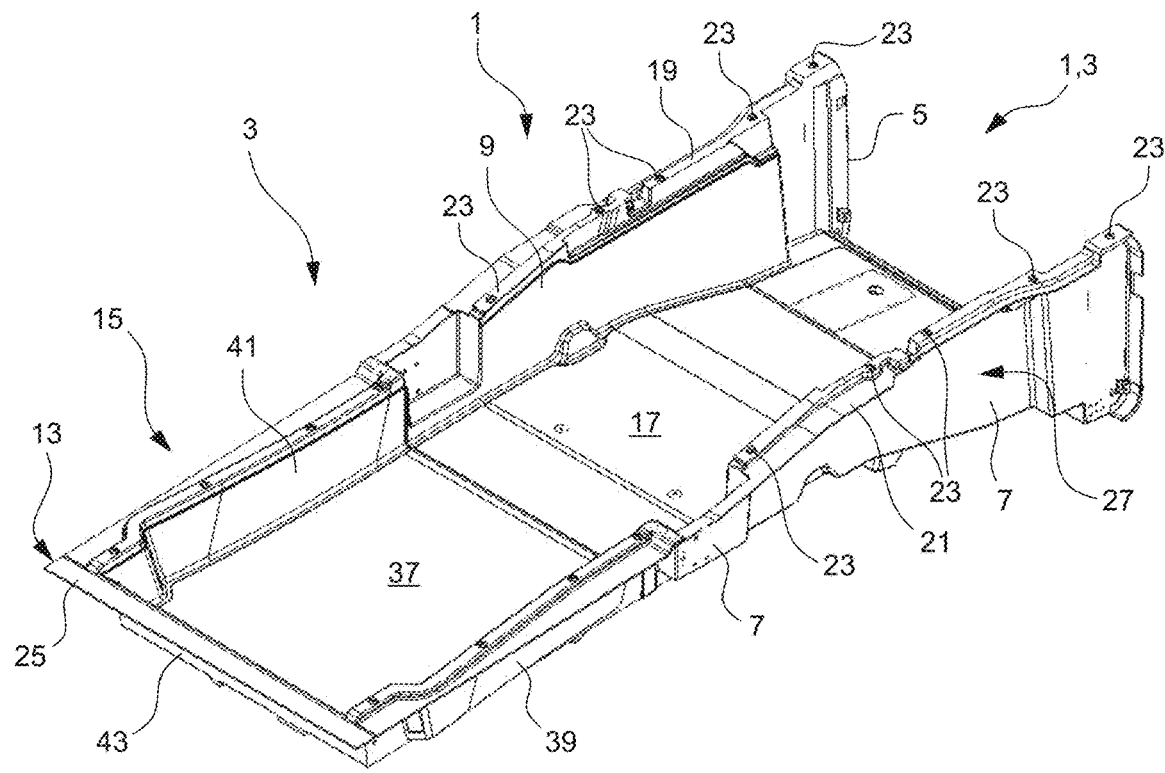
FIG. 5 shows the replacement floor according to FIG. 4 in an assembly state.

Referring to FIGS. 4 to 6, an exemplary embodiment of a replacement floor 3 according to the disclosure is illustrated. In FIG. 4, a base floor part 1, which may be configured according to the base floor part of FIGS. 1-3, is shown in a preassembled state next to an extension floor part, generally indicated with the reference sign 15, configured to be connected with the base floor part 1 in order to form an individual replacement floor 3 (FIG. 5). The example extension module 15 has essentially the same ground structure as the base floor part 1 and comprises a bottom wall 37, connecting to opposite lateral side walls 39, 41 and an endphase 43 facing in the forward direction of the vehicle.

As can be seen in FIG. 5, in the mounted state of the base floor part 1 and the extension floor part 15 forming the replacement floor 3 a continuous bottom wall is formed, which, in the vehicle, will serve as the new ground of the vehicle and which may be covered with a flooring. The replacement floor 3 enlarges the rear cargo space of the vehicle thereby enabling wheelchair access from the back of the car and enabling storage of the wheelchair within the cargo space of the vehicle, namely on the bottom wall 17, 37. According to an aspect of the disclosure, the base floor part 1 of the replacement floor 3 comprises a length in the longitudinal direction of the motor vehicle of at least 1000 mm and at most 1500 mm. On the one hand the length is chosen such that the replacement floor 3 may be formed by only adding one additional extension floor part 15 and on the other hand to be adaptable and flexible with regard to different available cargo spaces and different vehicle types because the base floor part 1 may easily be modified by separating the front end portion 13 therefrom in order to enable coupling of extension floor parts 15 of any length to also cover vehicle types with a larger axial dimension, respectively a larger cargo space.

Figure 6A:
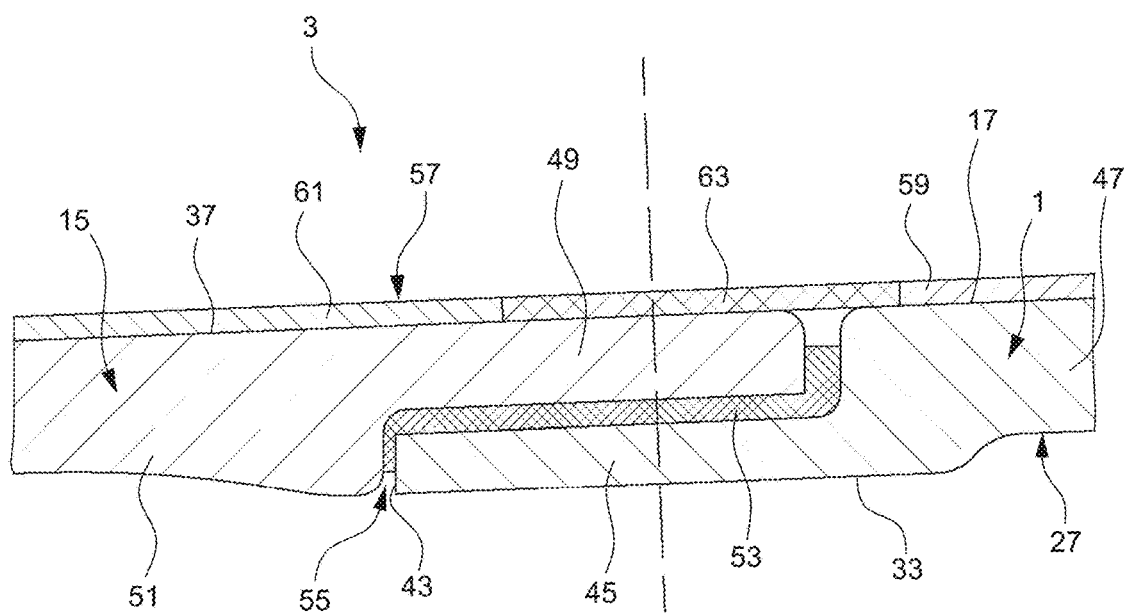
FIGS. 6a and 6b show a partial cross-section of a connection area of the replacement floor according to FIGS. 4 and 5.
Figure 6B:
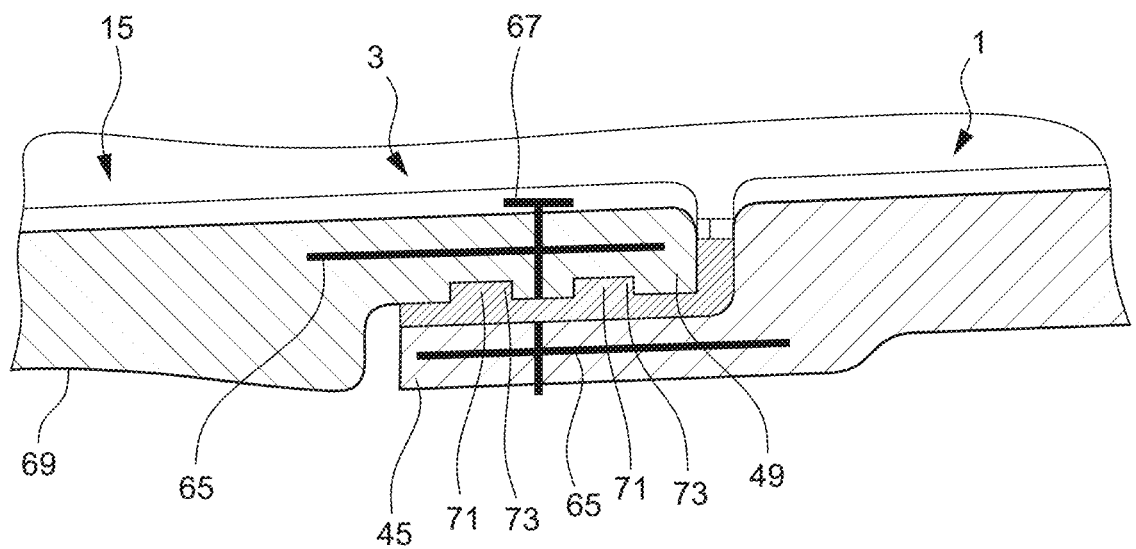

Referring now to FIGS. 6a and 6b, where schematic connection areas between a base floor part 1 and a corresponding extension floor part 15 of a replacement floor 3 are shown. In FIG. 6a, a front part of the base floor part 1 and a rear part of the extension floor part 15 are shown in an assembly state. The base floor part 1 has been modified by separating a front end portion 13 from the rest of the base floor part 1 along the marking 31, here in form of a notch 35, leaving an upright edge 43 forming a front-end-face of the base floor part 1. As can be seen in FIG. 6a, the base floor part 1 comprises a front connection section 45 having a thinner material thickness than the adjacent base floor part section 47 extending in the rearward direction of the vehicle. Analogously, the extension floor part 15 comprises a rear connection section 49 facing the connection section 45 and leading into an extension floor part 51 extending in the forward direction of the vehicle. Also, the connection section 49 of the extension floor part 15 comprises a thinner material thickness than the adjacent extension floor part section 51. The extension floor part 15 and the base floor part 1 are configured and dimensioned in particular such that the material thickness of the resulting replacement floor 3 is essentially constant. In order to connect the connection sections 49 and 45, a glue material 53 is introduced into a free space 55 between the extension floor part 15 and the base floor part 1. As can be seen in FIG. 6a, the extension floor part 15 and the base floor part 1 are assembled such that an S-shaped free space 55 remains which may be essentially filled with glue 53 to enable connecting of the parts.

As may also be seen from FIG. 6a, a cover flooring 57 is arranged on top of the bottom walls 37 and 17. The flooring may comprise of a base floor part flooring 59, an extension floor part flooring 61 and potentially, as shown in FIG. 6a, an interface flooring 63 covering the free space 55 and the glue 53.

In FIG. 6b, a further example of a connection between the rear base floor part 1 and the front extension floor part 15 of another embodiment of a replacement floor 3 is shown. In the area of the connection sections 49, 45 the base floor part 1 and the extension floor part 15 are provided with a reinforcement inlay, generally indicated with the reference number 65. In the case of FIG. 6b, the reinforcement inlay 65 is configured as a metal, in particular aluminum, frame which may be manufactured in one piece, respectively one manufacturing step, with the general composite or plastic material of the respective floor part 1, 15. The reinforcement inlay 65 may be provided such that it is not visible from the outside, rather completely covered by the material of the respective floor part. The reinforcement inlays 65 not only serve to stabilize and strengthen the connection area between the floor parts 15, 1, but also improve screwing of the floor parts 15, 1 by means of a screw, indicated with the reference sign 67.

Further referring to FIG. 6b, another example embodiment of the present disclosure is shown. On a bottom side 69 of the extension floor part 15, respectively the connection section 49, two gluing recesses 71 for receiving glue, indicated with the reference sign 73, in order to bond the connection sections 49, 45 together. The gluing recesses 71 may extend across the longitudinal direction of the base floor part respectively the extension floor part, in particular across their entire width dimension. An advantage of the gluing recesses 71 is that the glue 73 may be precisely introduced into the recesses 71 exactly at the right position and exactly in the right volume even when the assembly partners are already pre-assembled.

Figure 7:
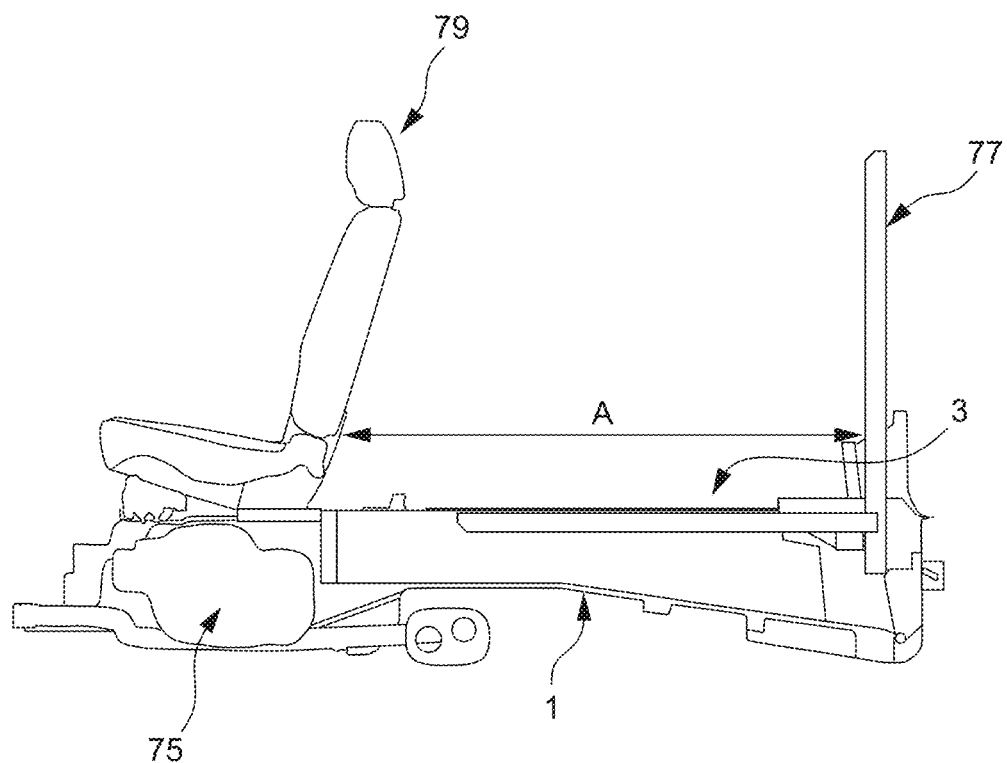
FIG. 7 shows a schematic side view of the base floor part according to FIG. 1 mounted in a vehicle, according to an exemplary embodiment.
Figure 8:
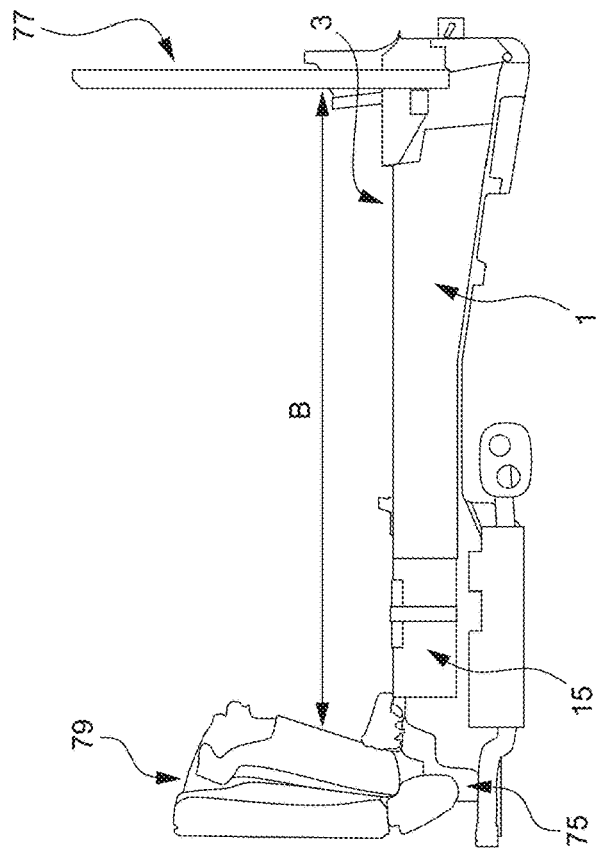
FIG. 8 shows an embodiment of a replacement floor in a preassembly state.
Figure 9:
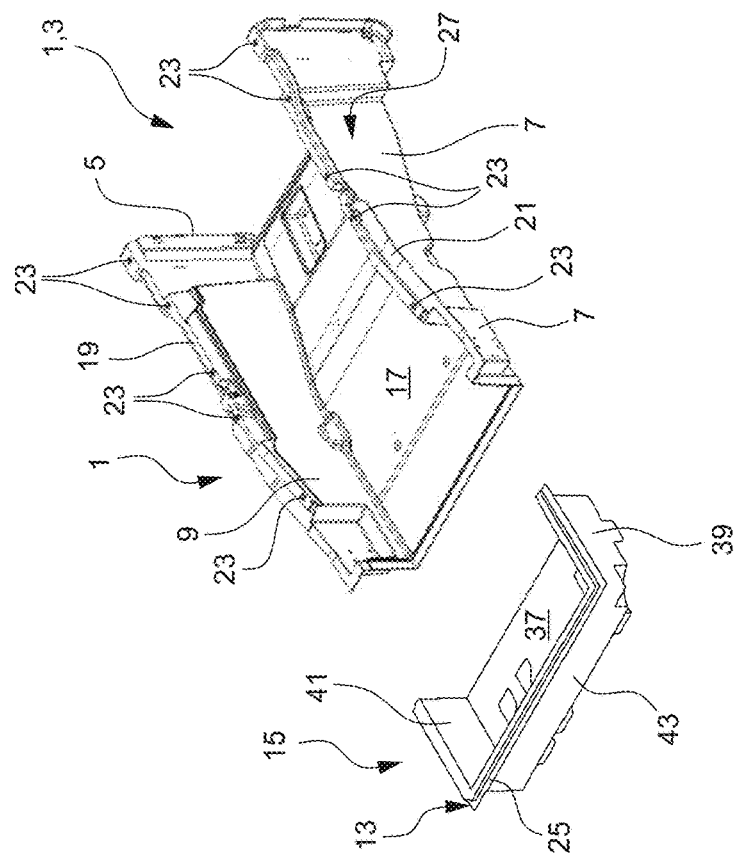
FIG. 9 shows the replacement floor according to FIG. 8 in a mounted state in a vehicle, according to an embodiment.
Figure 10:
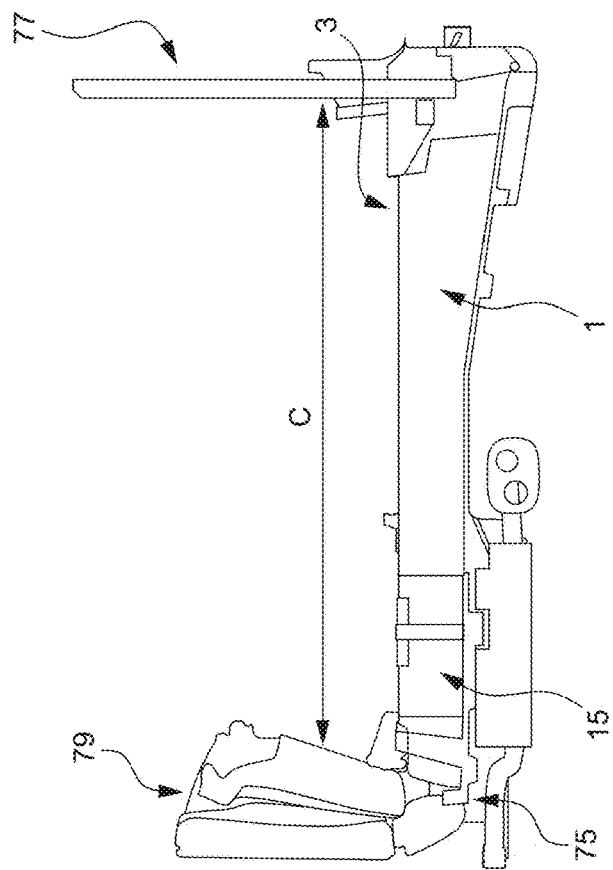
FIG. 10 shows an embodiment of a replacement floor in a preassembled state.

Referring to FIGS. 7 to 11, example embodiments of replacement floors 3 according to the disclosure are shown, thereby illustrating the modular system according to the disclosure. The modular system according to the disclosure may be understood in that a base floor part one according to FIG. 1 and two different extension floor parts 15, as shown in FIGS. 8 and 10, are provided in order to form individual replacement floors 3 for enlarging a rear cargo space of a motor vehicle. The different extension floor parts 15 at least differ in their axial dimension, in particular length. The base floor parts 1 of the replacement floors 3 according to the embodiments 8, 9 respectively 10, 11 may also differ from the base floor part 1 of FIG. 1, 7 or may be generated from the base floor part 1 according to FIG. 1, 7 by cutting off the front end portion 13 of the base floor part 1 via the preformed marking 31.

Figure 11:
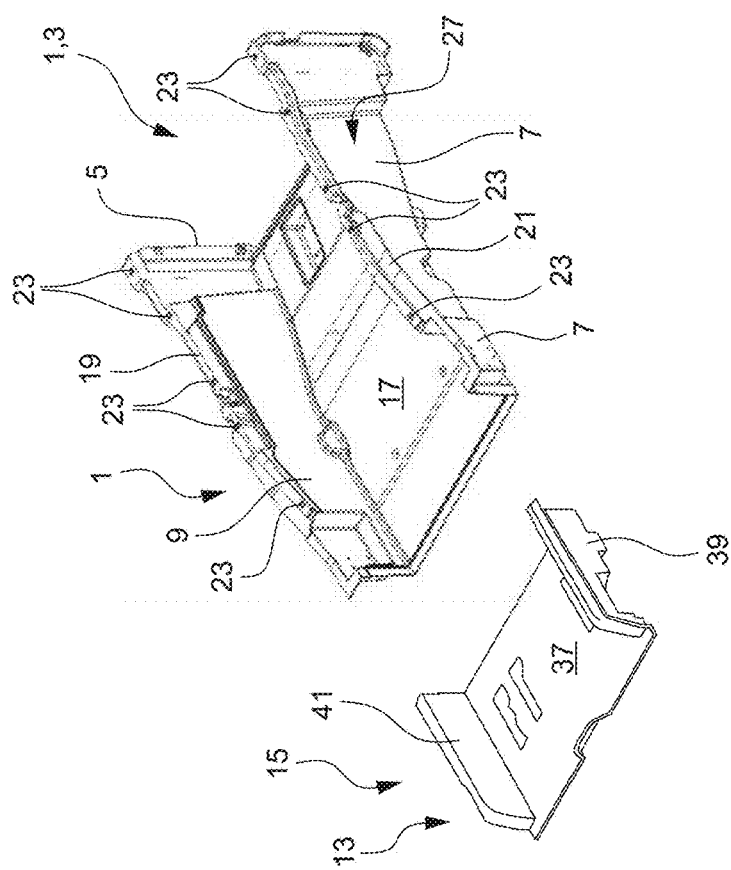
FIG. 11 shows a schematic side view of the replacement floor according to FIG. 10 mounted in a vehicle, according to an exemplary embodiment.

FIGS. 7, 9, 11 show schematic part views of the replacement floors 3 mounted in the rear cargo space of a vehicle and attached to a vehicle body 75 of the vehicle and further to a rear ramp 77 which enables wheelchair access into the rear cargo space from the backside of the vehicle. In FIG. 7, 9, 11 the ramp 77 is illustrated in an upright position which is especially suitable for storing a wheelchair in the rear cargo space on the replacement floor 3. The corresponding replacement floor parts, namely a base floor part 1 and potentially an extension floor part 15 are shown in FIG. 1 (corresponding to FIG. 7), FIG. 8 (corresponding to FIG. 9), and FIG. 10 (corresponding to FIG. 11).

It may be seen when comparing FIGS. 7, 9 and 11 that the axial length dimension A, B, C varies. In particular, axial dimension A of the replacement floor 3, which is built by the base floor part 1 alone, is smaller than the axial length dimensions B respectively C according to the embodiments of the replacement floors 3 according to FIGS. 9 and 11. Especially when comparing FIGS. 10 and 8, it may be seen that due to the increased axial dimension of the extension floor part 15 according to FIG. 10, the axial length dimension C of the respective replacement floor 3 in FIG. 11 is greater than the axial dimension B of the corresponding replacement floor 3 in FIG. 9.

The embodiments of FIGS. 7-11 highlight the inventive idea of the present disclosure to provide a modular conversion kit which enables flexibility and adaptability to different available cargo spaces by providing a predetermined number of different base modules parts 1 and a predetermined number of different extension floor parts 15 and by combining each base floor part 1 with each base floor part 15 to form an individual, single replacement floor 3 adapted to the available cargo space and/or the given vehicle type. An advantage of the prior art is that such a flexibility regarding different available spaces and/or different vehicle types has not been achieved. Further, in particular, for the case of injection molded base floor parts 1 and injection molded extension floor parts 15, the necessary number of injection molds is limited to the number of provided base floor parts 1 and extension floor parts 15. A new replacement floor for a new vehicle type or new available cargo space does not require to develop a new manufacturing mold, rather, it is possible to flexible combine an individual base floor part 1 with an individual extension floor part 15, thereby being able to cover a broad range of axial dimensions of the rear cargo space. For example, the axial dimension A of the replacement floor 3 in FIG. 7 is around 1330 mm, the axial dimension B of the replacement floor 3 FIG. 9 is around 1660 mm and the axial dimension C of the replacement floor 3 in FIG. 11 is around 1720 mm. As shown in FIG. 7, 9, 11 the axial dimensions A, B, C is measured between the upright ramp 77 and a passenger seat 79 limiting the rear cargo space.

The features disclosed in the above description, the figures and the claims may be significant for the realization of the disclosure in its different embodiments individually as in any combination.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 Base floor part
3 Replacement floor
5 Opening
7, 9 Side wall
11 End wall
13 Front end portion
15 Extension floor part
17, 37 Bottom wall
19, 21, 25 Attachment flange
27 rear end portion
31 Marking
33 Bottom Side
35 Notch
39, 41 Side wall
43 End wall
45, 49 Connection section
47 Rear base floor part section
51 Front extension floor part section
53 Glue
55 Free space
57 Flooring
59 Base floor part flooring
61 Extension floor part flooring
63 Interface flooring
65 Reinforcement inlay
67 Screw
69 Bottom side
71 Recess
73 Glue
75 Vehicle body
77 Ramp
79 Vehicle seat

The invention claimed is:

1. A base floor part made of plastic or composite material for a replacement floor and configured to be connected to a vehicle body of a vehicle to enlarge a rear cargo space of the vehicle on which a wheelchair is storable, the base floor part comprising:
a front end portion;
a rear end portion; and
a preformed marking at which the front end portion is separable from the rear end portion to enable coupling of the rear end portion with an extension floor part, wherein the marking is provided on a bottom side of the base floor part opposite the rear cargo space.

2. The base floor part according to claim 1, wherein the marking extends:
perpendicular with regard to a longitudinal extension of the base floor part; and/or across an entire width of the base floor part.

3. The base floor part according to claim 1, wherein the marking is configured as a material weakening that comprises a rectangular cross-section and/or a depth 0.5 mm to 2 mm.

4. The base floor part according to claim 3, wherein the base floor part is an injection or resin transfer molded component and/or is made of fiberglass, the base floor part and the material weakening being integrally formed.

5. The base floor part according to claim 1, wherein the base floor part comprises a length in its longitudinal extension of at least 1,000 mm and at most 1,700 mm.

6. A replacement floor for enlarging a rear cargo space of a vehicle on which a wheelchair is storable, the replacement floor comprising:
a rear base floor part made of plastic or composite material, the rear base floor part having a length in a longitudinal direction of the vehicle of at least 1,000 mm and at most 1,500 mm; and
an extension floor part made of plastic or composite material connected to the base floor part,
wherein the rear base floor part includes:
a front end portion;
a rear end portion; and
a preformed marking at which the front end portion is separable from the rear end portion to enable coupling of the rear end portion with the extension floor part.

7. The replacement floor according to claim 6, wherein the base floor part and/or the extension floor part are reinforced by a reinforcement inlay, wherein the base floor part and/or the extension floor part respectively include the corresponding reinforcement inlay integrally formed by injection or resin transfer molding.

8. The replacement floor according to claim 6, wherein the base floor part and the extension floor part each comprise a predefined connection section configured to connect with each other, wherein:

at least the connection section of the base floor part and/or of the extension floor part is reinforced by a reinforcement inlay, and/or the connection section of the base floor part and/or of the extension floor part is provided with at least one gluing recess configured to receive glue extending across the longitudinal direction.

9. A modular system for a replacement floor according to claim 6 for enlarging a rear cargo space of a vehicle on which a wheelchair is storable, the modular system comprising:
   a predetermined number of the rear base floor parts each having a predetermined dimension and a predetermined number of front extension floor parts each having a predetermined dimension,
   wherein each base floor part is configured to be connected with each extension floor part to form a replacement floor, and
   wherein at least one of the base floor parts and/or at least one of the extension floor parts includes a dimension which differs from the dimension of at least one other of the base floor parts and/or at least one other of the extension floor parts.

10. The modular system according to claim 9, wherein the length of each of the front extension floor parts is different than the length of each of the rear base floor parts.

11. The modular system according to claim 9, wherein the predetermined dimension is a length in the longitudinal direction of the vehicle.

12. A method for enlarging a rear cargo space of a vehicle, comprising:
   providing a predetermined number of rear base floor parts each having a predetermined dimension and a predetermined number of front extension floor parts each having a predetermined dimension, wherein at least one of the base floor parts and/or at least one of the extension floor parts has a dimension which differs from the dimension of at least one other of the base floor parts and/or at least one of the other extension floor parts; and
   connecting the at least one base floor part and the at least one extension floor part to form a replacement floor, wherein each of the base floor parts include:
   a front end portion;
   a rear end portion; and
   a preformed marking at which the front end portion is separable from the rear end portion to enable coupling of the rear end portion with one of the extension floor parts.

13. The method according to claim 12, wherein a base floor part flooring is disposed onto the one base floor part and an extension floor part flooring is disposed onto the one extension floor part such that the base floor part flooring and the extension floor part flooring overlap each other crosswise with regard to a longitudinal extension of the one base floor part and the one extension floor part, wherein the base floor part flooring and the extension floor part flooring are cut in a single cutting operation to form a continuous transition between the base floor part flooring and the extension floor part flooring.

14. A base floor part made of plastic or composite material for a replacement floor and configured to be connected to a vehicle body of a vehicle to enlarge a rear cargo space of the vehicle on which a wheelchair is storable, the base floor part comprising:
   a front end portion;
   a rear end portion; and
   a preformed marking at which the front end portion is separable from the rear end portion to enable coupling of the rear end portion with an extension floor part, wherein the base floor part includes a length in its longitudinal extension of at least 1,000 mm and at most 1,700 mm.

15. A modular system for a replacement floor for enlarging a rear cargo space of a vehicle on which a wheelchair is storable, the modular system comprising:
   a predetermined number of rear base floor parts according to claim 1, each having a predetermined dimension and a predetermined number of front extension floor parts each having a predetermined dimension,
   wherein each base floor part is configured to be connected with each extension floor part to form a replacement floor, and
   wherein at least one of the base floor parts and/or at least one of the extension floor parts includes a dimension which differs from the dimension of at least one other of the base floor parts and/or at least one other of the extension floor parts.

\* \* \* \* \*